Aug. 7, 1951     M. C. ELLISON     2,563,777
RADIO BEACON SIMULATING SYSTEM
Filed Oct. 26, 1949     4 Sheets-Sheet 1

INVENTOR
MICHAEL C. ELLISON

BY Scrivener & Parker
ATTORNEYS

Aug. 7, 1951 M. C. ELLISON 2,563,777
RADIO BEACON SIMULATING SYSTEM
Filed Oct. 26, 1949 4 Sheets-Sheet 2

INVENTOR.
MICHAEL C. ELLISON
BY
Scrivener & Parker
ATTORNEYS

Aug. 7, 1951

M. C. ELLISON 2,563,777

RADIO BEACON SIMULATING SYSTEM

Filed Oct. 26, 1949

INVENTOR
MICHAEL C. ELLISON
BY Scrivener + Parker
ATTORNEYS

Aug. 7, 1951  M. C. ELLISON  2,563,777
RADIO BEACON SIMULATING SYSTEM
Filed Oct. 26, 1949  4 Sheets-Sheet 4

INVENTOR
MICHAEL C. ELLISON
BY Scrivener & Parker
ATTORNEYS

Patented Aug. 7, 1951

2,563,777

UNITED STATES PATENT OFFICE 2,563,777

RADIO BEACON SIMULATING SYSTEM

Michael C. Ellison, Arlington, Va., assignor to Engineering and Research Corporation, Riverdale, Md., a corporation of Maryland Application October 26, 1949, Serial No. 123,649

2 Claims. (Cl. 35—10.2)

This invention has to do broadly with devices and systems for training personnel in the operation of aircraft and other vehicles with respect to airways beacons of the so-called and well-known equisignal type such as the aural or A-N beacon. More particularly, the invention provides a means for simulating the signals radiated by such a beacon at any azimuthal point about the source of radiations.

The invention is described in the following specification and illustrated in the accompanying drawings, in which.

Figure 8:
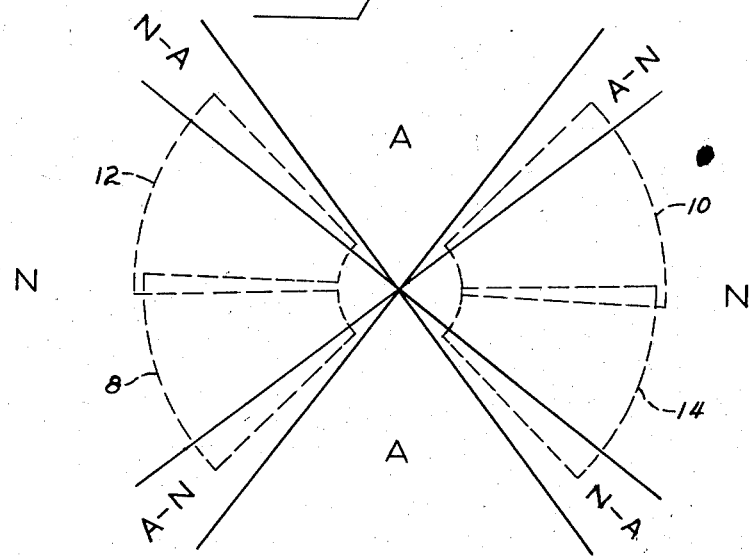
Figs. 7 and 8 are diagrammatic views showing a radio range beacon of the type simulated by the device provided by the invention.
Figure 7:
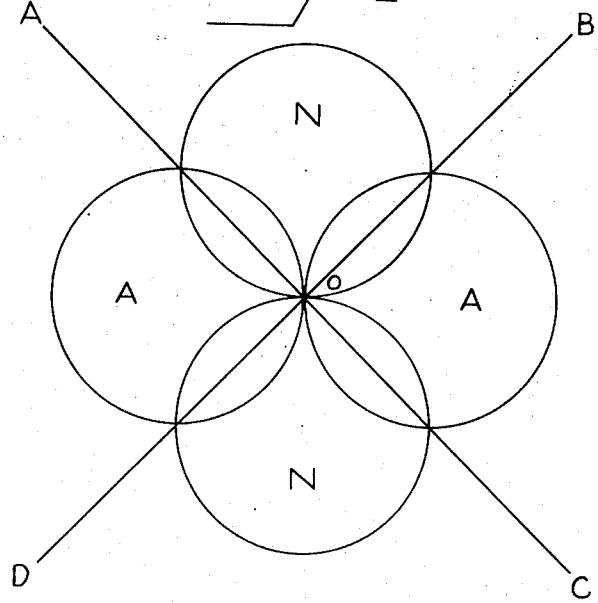

In training devices and systems of the type of which the invention may form a part the usual aircraft instruments which a pilot observes in flight are caused to move to simulate their movement during flight, and the pilot being trained is required to operate the various aircraft control means to maintain desired altitude and speed of flight. It is desirable, in such training devices, to provide some means for supplying to the pilot the usual radio range beacon signals which indicate to the pilot his azimuthal position with respect to the source of beacon radiations, in order that as the pilot manipulates the controls of the training device he will maneuver the aircraft with respect to the beacon courses. The usual radio range beacon of the type simulated by the invention is disclosed in Figs. 7 and 8 of the drawings of this application and is established by two intersecting figure-of-eight patterns (see Fig. 7) which are respectively modulated with the Morse code characters A and N, thus establishing two quadrants in which only the modulation N is audible, two quadrants in which only the modulation A is audible, and four courses OA, OB, OC and OD along which the A and N modulations are of equal intensity and interlock to provide a continuous signal instead of the discontinuous characteristic signals of the A and N quadrants, which quadrants and courses are illustrated in Fig. 8. In the operation of the training device the position of the aircraft, as determined by the original settings of its various instruments and by its maneuvers subsequent to the original setting, varies with respect to the beacon courses and the beacon signal corresponding to the position of the aircraft with respect to the beacon courses at every instant must be supplied constantly to the pilot, in exactly the same manner as if he were flying an actual aircraft with respect to the beacon.

Figure 6:
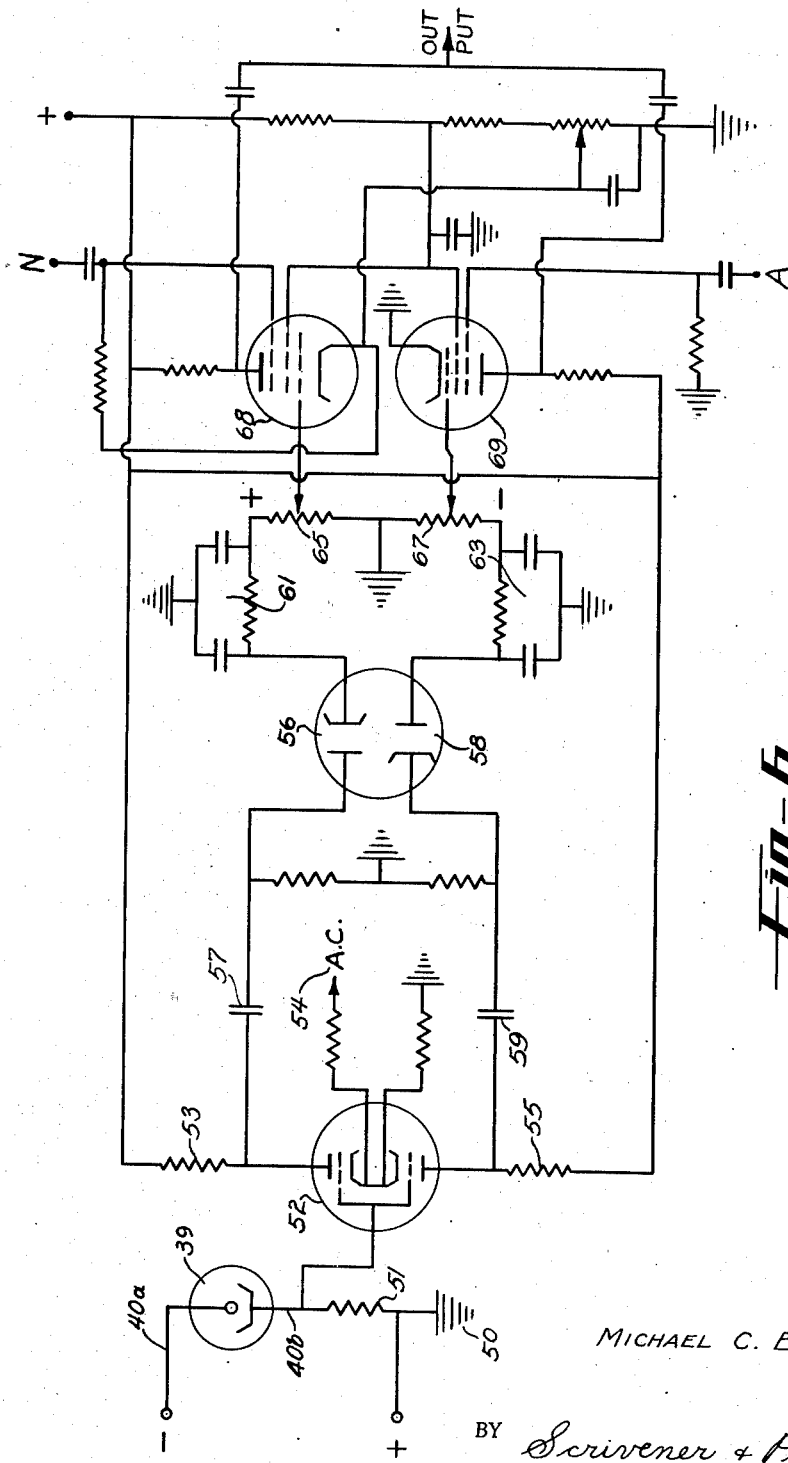
Fig. 6 is a diagram of the circuit controlled by the photo-electric cell to produce the proper beacon signal.

The invention provides means for providing these simulated beacon signals, and such means comprise the apparatus disclosed in Figs. 1 to 5 of the drawings and the electrical and electronic means disclosed in Fig. 6. This apparatus comprises a light-tight cylindrical casing 2 divided into upper and lower compartments by a translucent plate 4 which transmits from the lower compartment to the upper light from one or more sources 6 in the lower compartment. In the upper compartment, above and adjacent the screen 4, a translucent cup-shaped member 5 is supported by the walls of casing 2 and within this member are four sector-shaped opaque plates 8, 10, 12, 14. These plates are movably mounted on an upstanding support 16 which is concentric with the casing 2 and is mounted on the cup-shaped member 5. The outer edge part of each sector is received in one of two circumferential slots 18, 19 formed one above the other in the inner surface of the upstanding side wall of the cup-shaped member 5, the outer edge of sectors 8 and 10 being received in the upper slot and those of sectors 12 and 14 being received in the lower slot. The plates are mounted for adjustment about the support 16 and the support is formed with an axial threaded opening receiving a nut 20 by which the sectors may be clamped in any position to which they are adjusted. These sector plates are clearly shown in Fig. 2 and it will be seen that they may be adjusted to any desired relative positions to form sector-shaped opaque and translucent areas of any desired sizes.

Within the casing 2 and positioned above the sector assembly is an axially-extending shaft 30 rotatably journaled in the upper end wall 32 of the casing and adapted and connected to be rotatably adjusted through gearing 34 by the computer shaft of an aircraft-movement simulating mechanism 35, whereby its angular position will at all times be a function of the original position of the simulated aircraft and its movement from such original position. At its lower end, i. e. the end adjacent the sector assembly, the shaft carries a plate 36 which is parallel to the sectors and on which, in a position above the sector plates, is mounted a cylindrical, light-tight casing 38 containing a photo-electric cell 39 which is connected through leads 40 to contacts 42 on plate 44 which is mounted on shaft 30 for movement therewith, and which contacts are in sliding electrical contact with similar contacts 46 on a plate 48 which is rigidly mounted on a fixed cylindrical housing 50 bolted to casing 2.

Figure 1:
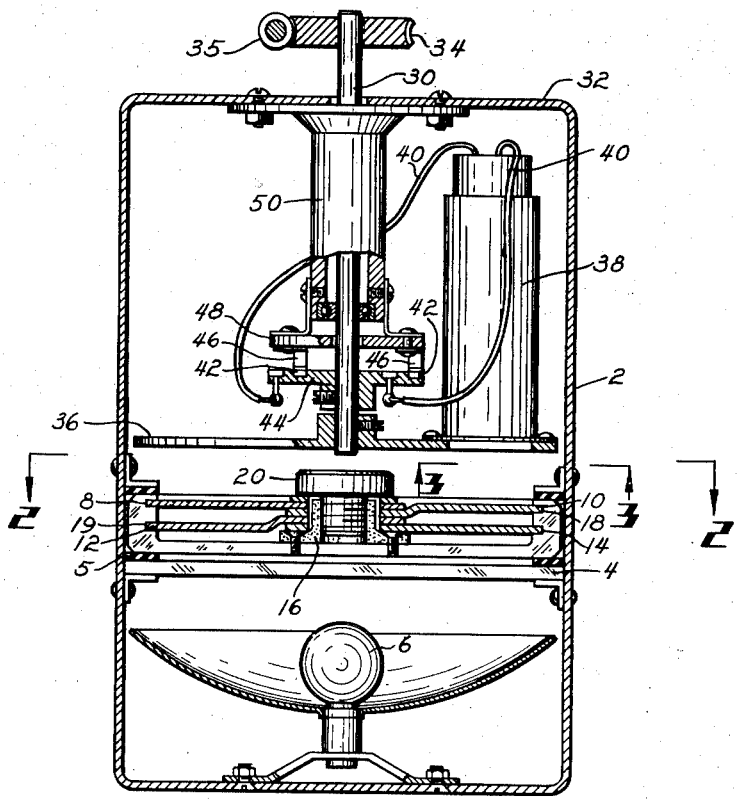
Fig. 1 is a side view, in section, of a beacon simulating device according to the invention.
Figure 3:
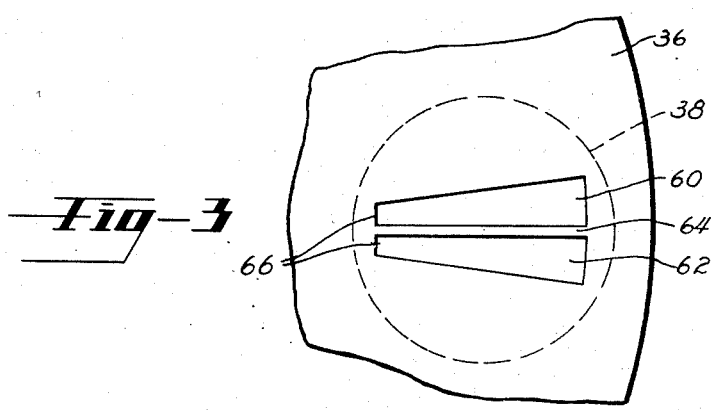
Fig. 3 is an enlarged view taken on line 3—3 of Fig. 1 showing the aperture of the photoelectric cell.
Figure 2:
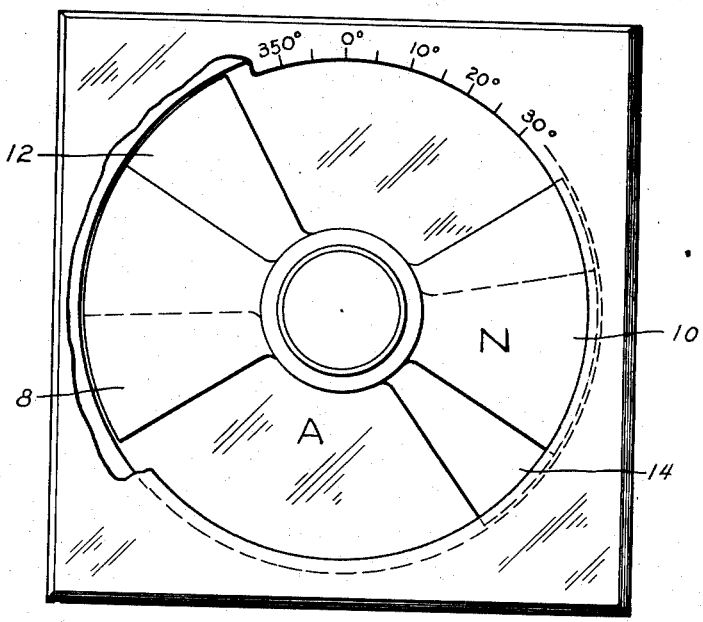
Fig. 2 is a plan view of the adjusting segments, taken on line 2—2 of Fig. 1, parts being broken away to more clearly show the complete segments.
Figures 4, 5:
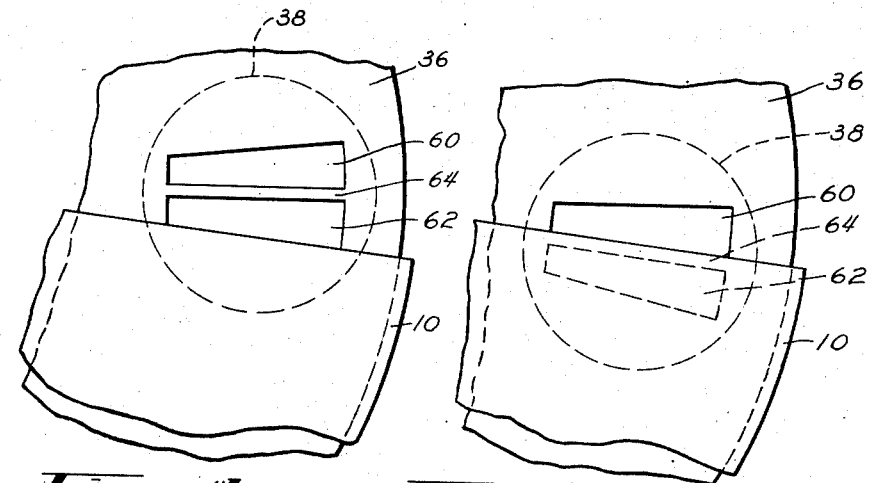
Fig. 4 is an enlarged view showing the aperture of the photo-electric cell adjacent an edge of one of the segments.
Fig. 5 is a view which is similar to Fig. 4 but shows the bar of the aperture positioned over the edge of the segment.

The plate 36 and the lower end of photo-electric cell casing 38 are suitably apertured to provide an opening into the casing which is the only means by which light may enter it and fall on the photo-electric cell therein. This opening is of special shape and is shown in Figs. 3, 4 and 5 and comprises two trapezoidal-shaped apertures 60, 62 arranged with their bases adjacent each other and spaced by an opaque bar 64. These apertures are so shaped and arranged that their narrower ends 66 are radially innermost and their wider ends radially outermost.

The photo-cell 39 forms part of and controls means for producing an aural A, N or on-course signal depending on and corresponding to the position of the apertures 60, 62 with respect to the open and closed quadrants determined by the sector plates and therefore corresponding to and indicating the azimuthal position of the aircraft with respect to the simulated beacon. Such means are disclosed in the circuit diagram of Fig. 6 which will be described generally and operatively rather than in precise detail. In this circuit the plate of the photo-cell is connected to the negative terminal of a source of electric energy (not shown) through lead 40a. The cathode is connected through lead 40b and a resistor 51 to ground at 50 and to the positive terminal of the source of electric energy. The cathode of the photocell is also connected to the grids of tube 52, the cathodes of which are connected to an A. C. source 54. The plates of tube 52 are connected through resistors 53 and 55 respectively to a positive source of electric energy and through condensers 57 and 59 respectively to the plate and cathode respectively of rectifiers 56 and 58. The outputs of rectifiers 56 and 58 are respectively fed through smoothing circuits 61 and 63 to potentiometers 65 and 67 which supply the grid signals for tubes 68 and 69 respectively. An N (— .) modulated signal from a signal generator (not shown) is supplied to the screen grid of tube 68 and an A (. —) modulated signal is supplied to the screen grid of tube 69. The plate circuits of these two tubes are connected to an output circuit which includes means (not shown), such as ear phones, for producing an aural A, N or combined signal.

The described circuit operates in the following manner. The conductivity of the photocell 39 varies in accordance with the incident light in a manner well known in the art. Hence, the grid voltage of tube 52 will vary in accordance with the incident light on the photocell. The circuit components are chosen so that, with no incident light on the photocell, the positive peaks of the A. C. signal on the cathode of tube 52 will just swing the grid-to-cathode voltage of the tube to cutoff. Under this condition the A. C. signal on the plates of tube 52 will have a maximum peak to peak amplitude. As the incident light on the photocell is increased the grid bias of tube 52 is increased, due to the increased current in the resistor 51, and the A. C. signal on the cathode of tube 52 will swing the grid-to-cathode voltage more and more below cutoff resulting in a decreasing peak to peak amplitude of the A. C. signal on the plates of tube 52. The A. C. signals on the plates of tube 52 are fed to rectifiers 56 and 58, respectively, which are oppositely polarized and conduct on alternating half cycles. The signals from the rectifiers are fed through circuits 61, 63 to the potentiometers 65, 67 respectively. Thus, as the peak to peak amplitude of the A. C. signals on the plates of tube 52 decreases with increasing incident light on the photocell, the signals through the rectifiers smoothing circuits and potentiometers will decrease, resulting in a less positive potential on the grid of tube 68 and a less negative potential on the grid of tube 69. The decrease in the positive potential on the grid of tube 68 results in less N signal being produced on the plate of said tube and in the output circuit, while a decrease in the negative potential of the grid of tube 69 results in more A signal being produced on the plate of said tube and in the output circuit.

The potentiometers 65, 67 are adjusted so that when the bar 64 of the photocell casing is over an edge of a quadrant leaving one of the apertures fully blanked, A and N signals of equal amplitude are fed to the output circuit. The other circuit components are chosen so that with no incident light on the photocell (i. e., when both apertures are blanked) an N signal of maximum amplitude only is fed to the output circuit and with full incident light (i. e., when neither aperture is blanked) an A signal of maximum amplitude only is fed to the output circuit. Under the no light condition the grid of tube 68 is at a maximum positive potential and the grid of tube 69 is at a maximum negative potential resulting in minimum grid bias on tube 68 and maximum grid bias on tube 69. Tube 69 will be cut off under this condition and tube 68 will be operating at maximum gain causing a maximum amplitude N signal and no A signal to appear at the output. Under the full light condition the action is reversed. The grid of tube 68 will be at a minimum positive potential giving a maximum grid bias and the grid of tube 69 will be at a minimum negative potential giving a minimum grid bias. Tube 68 will then be cut off allowing no N signal to appear at the output and tube 69 will be operating at maximum gain allowing a maximum amplitude A signal to appear at the output.

In the operation of the described apparatus the sector plates are first so adjusted with respect to each other that each pair of plates overlaps sufficiently that the pair just covers one of the quadrants of the pattern of the beacon being simulated. For example, as shown in Fig. 8, the pair of plates 8, 12 are so adjusted that the outer radial edges of the two plates coincide with the radial center-lines of the two equi-signal zones at opposite sides of one N quadrant and the pair 10, 14 are so adjusted that their outer edges coincide with the center-lines of the equi-signal zones defining the other N quadrant. Thus, the sector plates cover each N quadrant, leaving the A quadrants open. The shaft 30 and the photo-cell 39 are constantly adjusted angularly by the computer shaft 35 and gearing 34 to a position which is dependent on the simulated angular movement of the aircraft with respect to the beacon and therefore the aperture 60, 62 of the photo-cell casing constantly occupies a position over and with respect to the sector plates corresponding to the position of the aircraft with respect to the quadrants of the beacon. As stated hereinbefore, when both apertures are blanked only an N signal will be transmitted to the pilot. As the photocell casing 38 is adjusted angularly by the computer shaft 35 one of the apertures 60, 62 will be gradually unblanked. As this occurs the intensity of the transmitted N signal will decrease and the circuit of Figure 6 will begin to transmit an A signal. The intensity of the N signal will continue to decrease and that of the A signal to increase as more of the aperture is unblanked. When one of the apertures is fully unblanked, the A and N signals will be of equal intensity and the bar 64 will be over an edge of sector plate. During the time that the bar 64 is over the edge of a sector plate, the intensity of the two signals will be equal. Then as the other aperture begins to be unblanked, the intensities will again start to vary until both apertures are fully unblanked, at which time the transmitted A signal will be of maximum intensity and the N signal will be cut off.

In the standard beacon station of the equi-signal type, the courses OA, OB, OC and OD (see Figure 7) are approximately three-degrees wide. That is, for a three-degree region around each of these courses, the A and N signals are of equal intensity. Bar 64 between apertures 60 and 62 (Figure 3) is approximately three-degrees wide and is provided to simulate this condition. As the bar passes over the edge of one of the sectors 8, 10, 12, 14 the intensities of the A and N signals remain constant and equal.

While I have described and illustrated one embodiment of my invention, it will be apparent to those skilled in the art that other embodiments, as well as modifications thereof, may be made without departing in any way from the spirit or scope of the invention for the limits of which reference must be had to the appended claims.

What is claimed is:

1. Apparatus for simulating the signal received at any point surrounding the source of a range beacon of the equi-signal type, comprising a plurality of segment-shaped plates mounted on a common central shaft for separate adjusting movement about the shaft and means for clamping said plates in any adjusted position for establishing a plurality of opaque segments and translucent segments surrounding a common central point and corresponding in number and position to the segments of an equi-signal beacon, a source of light disposed on one side of said segments whereby light therefrom passes through the translucent segments and is blocked by the opaque segments, a photo-electric cell disposed on the opposite side of said segments, means supporting said cell for adjusting rotation about a fixed axis containing the common central point of said segments, means for selectively generating the different signals radiated by a range beacon, and means responsive to the amount of light falling on said cell to select the signal generated by said means.

2. Apparatus for simulating the signal received at any point surrounding the source of a range beacon of the equi-signal type, comprising means adjustable about a common center for establishing a plurality of opaque segments and translucent segments surrounding a common central point and corresponding in number and position to the segments of an equi-signal beacon, a source of light disposed on one side of said segments whereby light therefrom passes through the translucent segments and is blocked by the opaque segments, a photo-electric cell disposed on the opposite side of said segments, means supporting said cell for adjusting rotation about a fixed axis containing the common central point of said segments, a light-tight casing housing said photo-electric cell and having a single aperture adjacent the segments through which light is admitted to the cell, said aperture having an opaque bar extending centrally thereof and radially of the common center of movement of the cell and the segments, means for selectively generating the different signals radiated by a range beacon, and means responsive to the amount of light falling on said cell to select the signal generated by said means.

MICHAEL C. ELLISON.

REFERENCES CITED

The following references are of record in the file of this patent:

UNITED STATES PATENTS

| Number | Name | Date |
| --- | --- | --- |
| 2,429,597 | Andrews | Oct. 28, 1947 |
| 2,444,477 | Stout | July 6, 1948 |
| 2,452,038 | Crane | Oct. 26, 1948 |
| 2,454,503 | Crane | Nov. 23, 1948 |
| 2,460,877 | Dehmel | Feb. 8, 1949 |
| 2,475,600 | Eytinge | July 12, 1949 |
| 2,485,435 | Dehmel | Oct. 18, 1949 |
| 2,492,964 | Butterly | Jan. 3, 1950 |
| 2,494,566 | Linderman | Jan. 17, 1950 |
| 2,499,990 | Dehmel | Mar. 7, 1950 |
| 2,510,385 | Dehmel | June 6, 1950 |